US005703834A

United States Patent [19]

Bonnefoy

[11] Patent Number: 5,703,834

[45] Date of Patent: Dec. 30, 1997

[54] ULTRASONIC SENSOR AND METHOD OF USING SUCH A SENSOR

[75] Inventor: Pierre Bonnefoy, Cagnes-Sur-Mer, France

[73] Assignee: IMRA Europe SA, Valbonne, France

[21] Appl. No.: 621,435

[22] Filed: Mar. 25, 1996

[30] Foreign Application Priority Data

Mar. 23, 1995 [FR] France .................................. 93 03414

[51] Int. Cl.[6] .................................................. G01S 15/00

[52] U.S. Cl. .................................................. 367/99

[58] Field of Search .................................. 367/140, 153, 367/138, 99

[56] References Cited

U.S. PATENT DOCUMENTS

| | | | |
|---|---|---|---|
| 4,381,144 | 4/1983 | Breslau | 367/99 |
| 5,165,064 | 11/1992 | Mattaboni | 901/1 |
| 5,426,619 | 6/1995 | Madden et al. | 367/153 |

FOREIGN PATENT DOCUMENTS

| | | |
|---|---|---|
| 38 11 479 | 10/1989 | Germany . |

OTHER PUBLICATIONS

Ocean Technologies And opportunities In The Pacific For The 90's, Honolulu, Oct. 1–3, 1991, "Design considerations of Uniform Circular Projector Arrays for High Power Applications", Joseph P M et al., pp. 1562–1564.

*Primary Examiner*—Daniel T. Pihulic
*Attorney, Agent, or Firm*—Oliff & Berridge

[57] ABSTRACT

A ultrasonic sensor for detecting the location of objects disposed in a substantially gaseous environment includes a plurality of nodes arranged into a uniform network. A plurality of circular transducers are provided such that each transducer is disposed at a node. The center of adjacent transducers are spaced at a distance no greater than the wavelength of acoustic waves emitted by the transducers. A method of detecting the location of objects disposed in a substantially gaseous environment is also disclosed.

9 Claims, 4 Drawing Sheets

ULTRASONIC SENSOR AND METHOD OF USING SUCH A SENSOR

BACKGROUND OF THE INVENTION

1. Field of the invention

The present invention relates to an ultrasonic sensor and a method of using such a sensor for detecting objects in a substantially gaseous environment.

2. Description of Related Art

Conventionally, in the field of echography, ultrasounds are used in a liquid media to detect the location of objects. Sensors comprised of transducers are used to emit acoustic waves. A specified phase shift exists between multiple transducers organized into a matrix. A directional acoustic wave is generated by interferences. An echo of the acoustic wave travels back to the sensor. An image is reconstituted and reproduced on a screen by scanning and analyzing an observation field point by point. Scanning a field point by point requires a considerable number of ultrasonic wave emissions, e.g. shots. However, conventional ultrasounds remain an acceptable technique in liquid media, since ultrasonic waves propagate quickly and easily in liquids.

However, the use of conventional ultrasounds are not practical in a substantially gaseous environment, such as air. The displacement speed of the acoustic waves is slow in air. This slow wave speed lengthens the scanning periods. The extended length of the scanning periods is prohibitive, especially for robotics applications. The industry lacks a sensor, comprised of a matrix of transducers, that effectively detects the location of objects in a substantially gaseous environment.

SUMMARY OF THE INVENTION

It is, therefore, an object of the present invention to provide a sensor, comprised of a matrix of transducers, that effectively detects the location of objects in a substantially gaseous environment. It is also an object of the present invention to provide a method of detecting effectively objects in a substantially gaseous environment.

The present invention is an ultrasonic sensor for detecting the location of objects in a substantially gaseous environment. The sensor is incorporated into a guidance system for a mobile robot. The sensor includes multiple transducers that operate at a specified set of frequencies. Nodes are organized into a uniform network. Each transducers is disposed at a node. The transducers are circular. The distance separating the center of adjacent transducer in the network is no greater than the wavelength of the acoustic waves emitted by the transducers.

In the operation of the invention, the acoustic is generated as a single frequency, a superimposition of random frequencies forming a noise, or a superimposition of fixed frequencies.

The invention is constructed to provide an ultrasonic wave having variable directivity. The number and position of transducers used to emit the acoustic wave determines the directivity of the wave. The shooting direction is, therefore, obtained by interferences, i.e. superimposing waves emitted simultaneously by a variable number of transducers. The shooting direction can be adjusted by creating a phase shift between the transducers.

The uniform network can be arranged to form a plane, sphere, or any other shape. It is easy and economical to manufacture the network into a plane. A sensor organized into a spherical cap is especially suitable for the purpose of emitting directional acoustic waves. Generally, the shape into which the transducers are organized is determined based upon the type of acoustic wave that is desired.

In the preferred embodiment of the invention, the transducers are disposed in a triangular mesh network of nodes.

The sensor according to the present invention can cover an observation field with acoustic waves by using a relatively small number of transducers. Transducers can be added to increase the global dimensions of the matrix, and thereby increase the directivity of the sensor. The directivity of the sensor in accordance with the invention is equivalent to the directivity of a single transducer having a diameter equal to the diameter of the entire matrix. However, the size of the sensor matrix can be incrementally increased by adding a limited number of transducers.

The sensor can include several rows of transducers wherein the transducers of each row share a common axis. The transducers can be arranged such that the axes of the several rows of transducers intersect at the center of a common central transducer. The transducers can be formed into a cross in a square mesh network. The transducers can also be formed into a six pointed star in a triangular mesh network. The span of the matrix is equal to the length of each row of transducers. The directivity of the sensor matrix is equivalent to the same number of transducers wherein each transducer is the size of the entire sensor matrix.

The above described matrix can be formed using a reduced number of transducers, i.e., on intersecting axes of a regular network. Arranging a reduced number of transducers in this manner reduces the energy of secondary waves that are emitted in directions different from the shooting direction, e.g. secondary lobes. This effect is especially pronounced when the transducers are arranged in a triangular mesh network.

The transducers can be constructed to simultaneously emit and receive an acoustic wave.

The present invention is also a method of detecting the location of objects in a substantially gaseous environment, such as air. The method is incorporated into a guidance system of a robot. The shape of an object is determined. The sensor emits an ultrasonic wave. The wave is propagated within a volume. The echo of the emitted ultrasonic wave is recovered. The energy of the echo is analyzed to determine if the geometric characteristics of the object were encountered by the wave. This method provides a high level of information per ultrasonic wave emission. Providing a quantity of information per emission is especially advantageous in view of the slow displacement speed of sound waves in gaseous environments.

Scanning an observation field, point by point, by emitting ultrasonic waves in the air is impractical for reasons previously described. However, the above-described method provides the location of an object rapidly by reducing the number of shots.

The method can be used to enable a mobile robot to navigate within an industrial or commercial structure. The robot must recognize a quantity of walls, doors, and other obstacles in order to move around. The above-described sensor enables the robot to recognize objects and obstacles. The sensor includes an electronic device programmed to cause the sensor to emit waves propagating inside specified volumes. The volumes coincide with the location of objects of known dimensions.

The sensor can recognize an open door by emitting waves propagating in a vertical plane, while scanning an observation field horizontally. The echo energy is high when the ultrasonic waves rebound off a wall. However, the echo energy suddenly decreases upon entering an open doorway. The robot, therefore, determines the presence of an open doorway upon detecting a sudden decrease of echo energy of a wave. Additional ultrasonic waves can be emitted to confirm the location of objects.

A specified number of contiguous transducers that are disposed in the same row are excited to emit an ultrasonic wave in a shooting plane. The axis of the row of transducers extends substantially perpendicular to the shooting plane.

Ultrasonic waves can be propagated inside a circular volume. A shooting axis is disposed at the center of the circular volume. Transducers disposed inside of a disk are excited. The disk has a specified radius. A central transducer is disposed at the center of the disk.

The sensor according to the invention has excellent directivity. It is, therefore, possible to obtain the location of an object disposed inside the propagation volume of the waves.

The transducers that emit the ultrasonic wave can also be used to collect the echo. When the transducers are aligned along an axis that intersects a central transducer, the transducers disposed at points of the star can receive the echo of the ultrasonic wave.

It is possible to determine the direction of an echo by specifying multiple transducers to receive the echo. Determining the direction of the echo is accomplished by measuring the phase shift between the transducers.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 3:
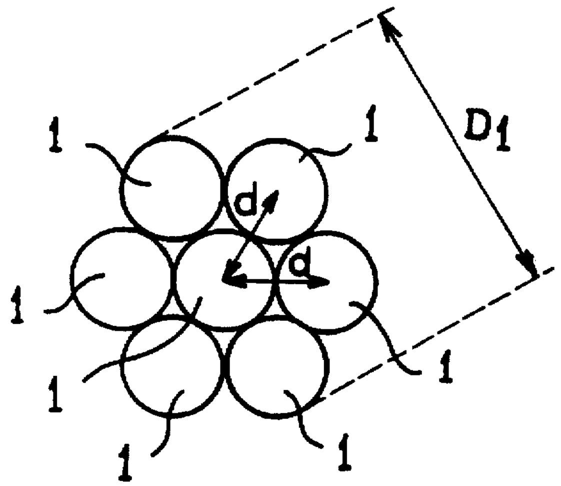
FIG. 3 is a schematic representation of a front of a sensor in accordance with yet another embodiment of the invention.

FIG. 3 is a schematic representation of a front of a sensor in accordance with an embodiment of the invention. The distance between the centers of two contiguous transducers 1 is no greater than the wavelength of the ultrasonic wave emitted.

Figure 2:
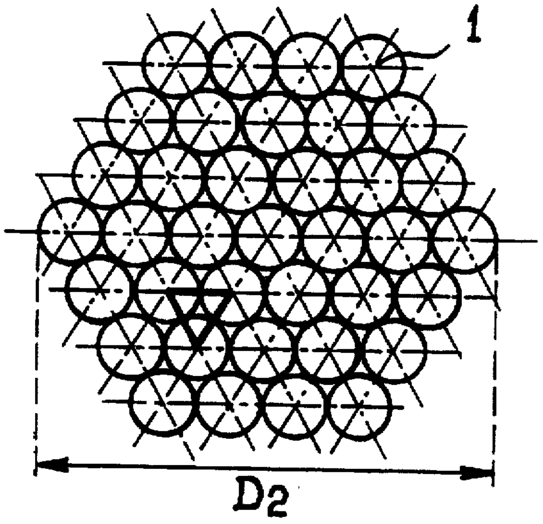
FIG. 2 is a schematic representation of a front of a sensor in accordance with another embodiment of the invention.

FIG. 2 is a schematic representation of a front of a sensor in accordance with another embodiment of the invention. The transducers 1 are disposed at nodes arranged in a uniform triangular mesh network.

The transducers 1 operate at a frequency of approximately 40 KHz. The 40 KHz frequency corresponds to an acoustic wave having a wavelength of approximately 8.5 mm. The transducers 1 are contiguous, since each transducer has a diameter d of approximately 8.5 mm.

The sensor shown in FIG. 3 has a directivity that corresponds to an average opening angle of approximately 20°, since the diameter $D_1$ of the entire sensor is equal to the diameter of three transducers 1.

The diameter $D_2$ of the entire sensor shown in FIG. 2 is approximately equal to 7 cm. The average opening angle is approximately 8°. The sensor of FIG. 2, therefore, has a higher directivity than the sensor shown in FIG. 3.

Figure 1:
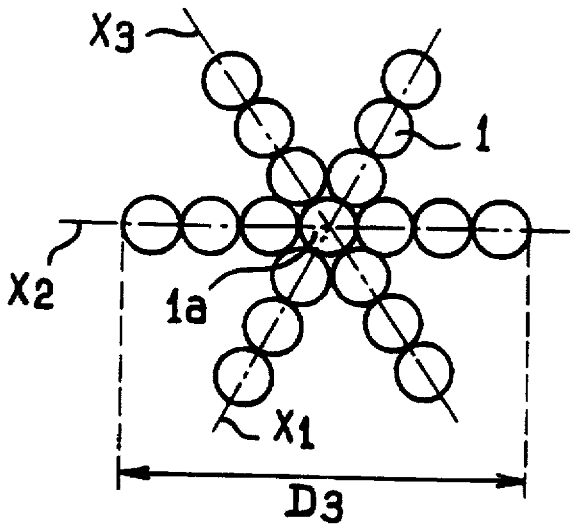
FIG. 1 is a schematic representation of a front of a sensor in accordance with the preferred embodiment of the invention.

FIG. 1 is a schematic representation of a front of a sensor in accordance with the preferred embodiment of the invention. The diameter $D_3$ is equivalent to the diameter $D_2$ of the sensor shown in FIG. 2. The directivity of the sensor is, therefore, approximately the same as the sensor shown in FIG. 2, even though the sensor of FIG. 1 has fewer transducers. Specifically, the sensor of FIG. 2 includes 37 transducers, whereas the sensor of FIG. 1 has only 19 transducers.

The transducers 1 are aligned along three separate axes X1, X2, and X3. The axes X1, X2, and X3 intersect at the center of a central transducer 1*a*. The intersecting axes form six 60° angles. The number of transducers is reduced by using a triangular mesh network. The transducers are thus disposed in a star formation. The star formation enables the transducers to emit acoustic waves with secondary lobes that are smaller than the secondary lobes of a sensor having a square mesh network. The secondary lobes are reduced because the star formation naturally increases the magnitude of the signal emitted by each transducer. The directivity of the signal emitted by several aligned sensors is approximately equal to the Fourrier transform of the number of sensors. When arranged in this formation, the Fourrier transform provides a broadened main lobe and flattened secondary lobes.

Figure 4:
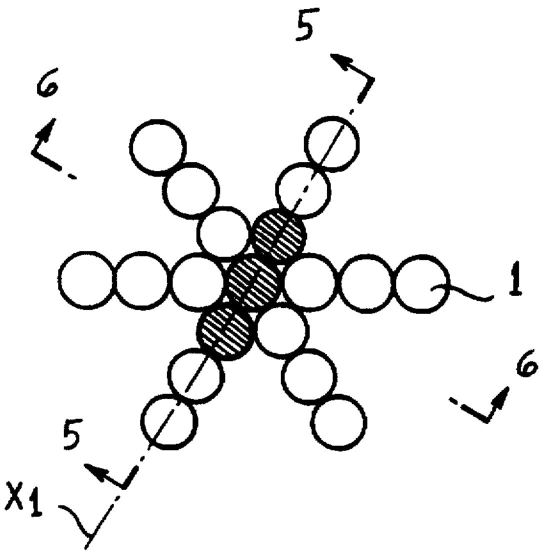
FIG. 4 is a schematic representation of a sensor emitting acoustic waves according to the arrangement of FIG. 1.

FIG. 4 is a schematic representation of a sensor emitting acoustic waves according to the arrangement of FIG. 1. The sensor can emit an ultrasonic wave from three continuous transducers disposed on the X1 axis. The three emitting sensors are shown in FIG. 4 with cross-hatching. The sensor of FIG. 4 emits an ultrasonic wave that propagates within a narrow volume.

Figure 6:
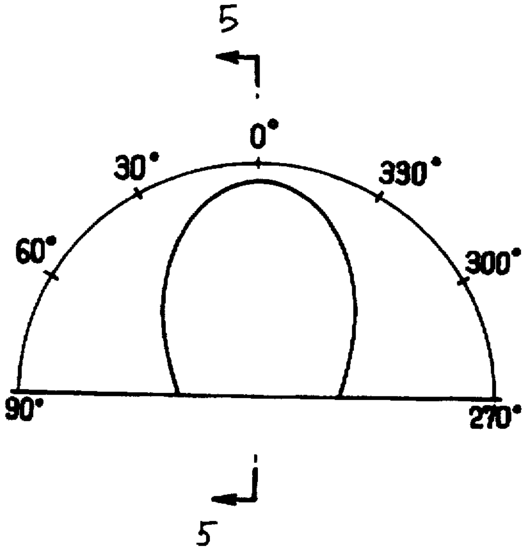
FIG. 6 is a sectional view taken along plane 6—6 of FIG. 4, and shows the angular directivity of ultrasonic waves emitted by the sensor.

FIG. 6 is a sectional view taken along plane 6—6 of FIG. 4, and shows the angular directivity of ultrasonic waves emitted by the sensor. The directivity of the plane shown in FIG. 6 is equivalent to the directivity of a single transducer, which is translated into an extended envelope of the ultrasonic wave energy according to the emission angle. The average opening angle of the wave is approximately equal to 100°.

Figure 5:
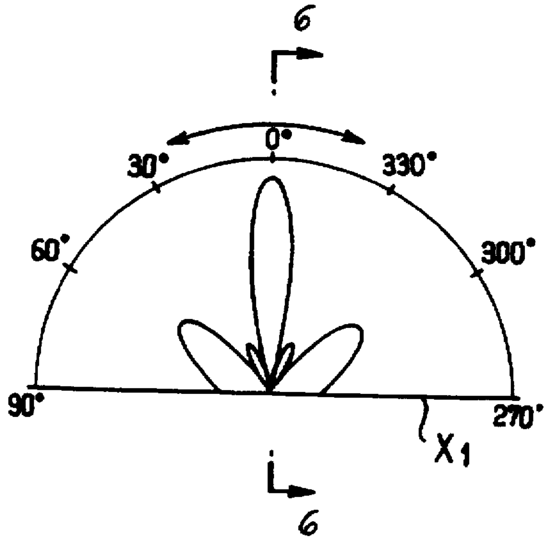
FIG. 5 is a sectional view taken along plane 5—5 of FIG. 4, and shows the angular directivity of ultrasonic waves emitted by the sensor.

FIG. 5 is a sectional view taken along plane 5—5 of FIG. 4, and shows the angular directivity of ultrasonic waves emitted by the sensor. However, in the plane shown in FIG. 5, the interference of the ultrasonic waves emitted by the three transducers is translated into a wave having a directivity more narrow than the directivity of the plane shown in FIG. 6. The wave has a main lobe and smaller secondary lobes. The average opening angle is approximately 20°.

The orientation of the plane shown in FIG. 6 is modified to scan an observation area along the X1 axis by varying the phase shifts between the three excited transducers of the sensor.

Figure 7:
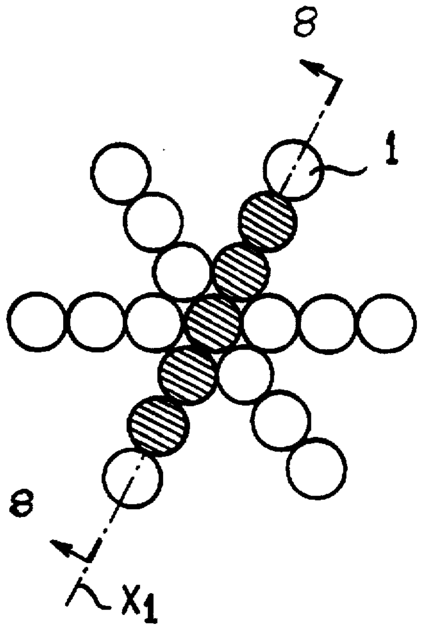
FIG. 7 is a schematic representation of a sensor emitting acoustic waves according to the arrangement of FIG. 1.

FIG. 7 is a schematic representation of a sensor emitting acoustic waves according to the arrangement of FIG. 1. The sensor shown in FIG. 7 includes an increased number of excited transducers 1. The directivity of the wave in a plane perpendicular to the plane of excited transducers, is similar to the directivity shown in FIG. 6.

Figure 8:
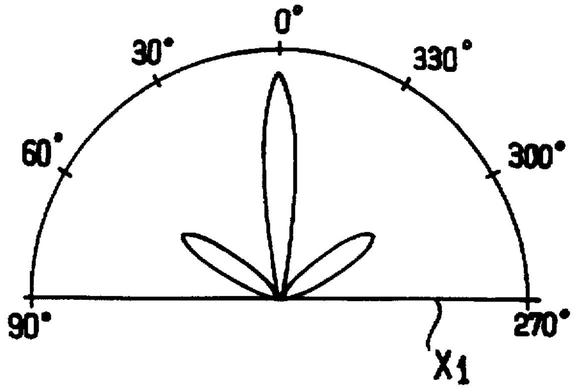
FIG. 8 is a sectional view taken along plane 8—8 of FIG. 7, and shows the angular directivity of ultrasonic waves emitted by the sensor.

FIG. 8 is a sectional view taken along plane 8—8 of FIG. 7, and shows the angular directivity of ultrasonic waves emitted by the sensor. The envelope of the energy of the ultrasonic waves is more narrow in the plane shown in FIG. 8 than the plane perpendicular to the plane of excited transducers. The average opening angle is approximately 8°.

Figure 9:
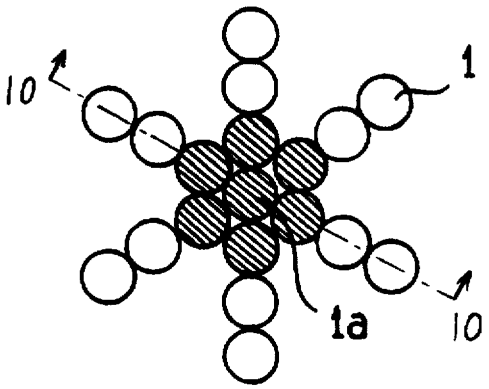
FIG. 9 is a schematic representation of a sensor emitting acoustic waves according to the arrangement of FIG. 1.

FIG. 9 is a schematic representation of a sensor emitting acoustic waves according to the arrangement of FIG. 1. FIG. 9 shows the excited transducers in cross-hatching. The excited transducers form a disc having a central transducer 1*a*. A wave is obtained by interference, and is propagating inside a volume also depicted in FIG. 10.

Figure 10:
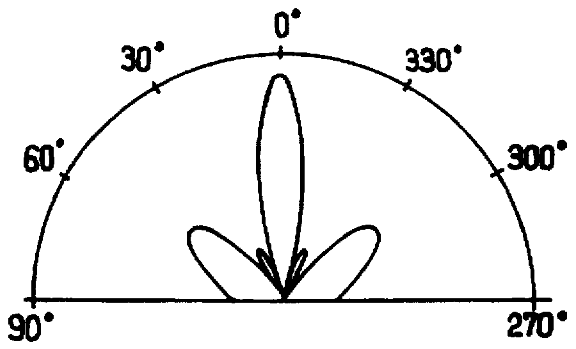
FIG. 10 is a sectional view taken along plane 10—10 of FIG. 9, and shows the angular directivity of ultrasonic waves emitted by the sensor.

FIG. 10 is a sectional view taken along plane 10—10 of FIG. 9, and shows the angular directivity of the ultrasonic waves emitted by the sensor. The average opening angle of the wave is approximately 20°. The directivity of the wave, i.e. the axis of the revolution volume inside which the ultrasonic wave propagates, can be adjusted by a phase shift between the transducers.

Tests of the invention have shown that good results are obtained by using transducers that have a small diameter. Using small diameter transducers provides a large interference area and enables the shooting direction to be varied to facilitate precise angular scannings of an observation area. The best results are obtained with the star arrangement shown in FIG. 1.

Transducers disposed at the ends of rows can be used to receive the echo of an emitted wave. The echo angle is determined by observing the time differential of reception by the various transducers. The location of an object is determined based upon the echo angle.

Figure 11:
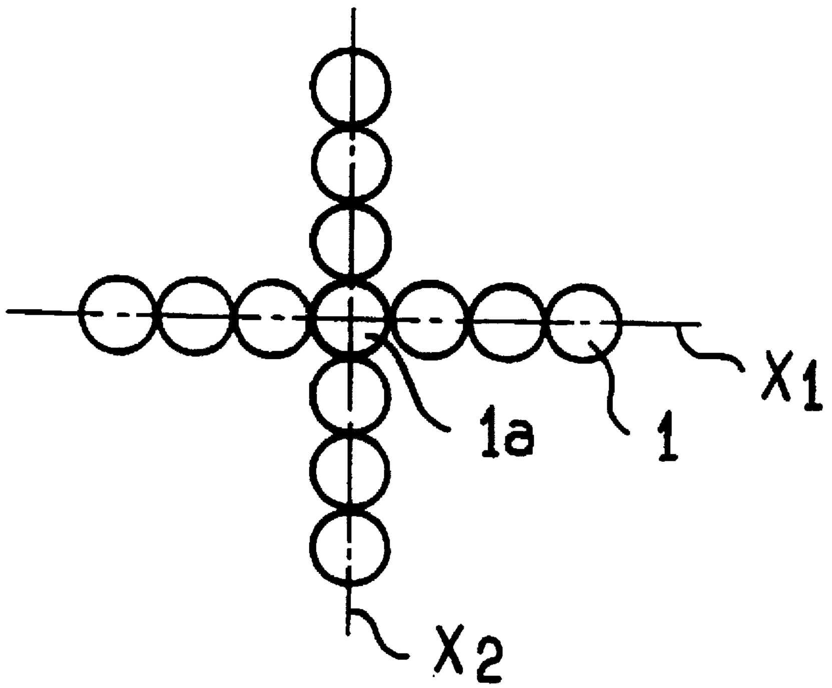
FIG. 11 is a schematic representation of a front of a sensor in accordance with yet another embodiment of the invention.

FIG. 11 is a schematic representation of a front of a sensor in accordance with yet another embodiment of the invention. Transducers are disposed at nodes of a square mesh network. The transducers are aligned on perpendicular axes X1 and X2. Axes X1 and X2 intersect at a common central transducer 1*a*. The sensor is especially suitable for transmitting ultrasonic waves propagating in thin volumes enveloping vertical and horizontal shooting planes.

Still other modifications, which will occur to persons skilled in the art, may be made without departing from the scope of the invention as defined in the following claims.

What is claimed is:

1. An ultrasonic sensor for detecting the location of objects disposed in a substantially gaseous environment, comprising:

a plurality of nodes arranged into a uniform network; and a plurality of circular transducers that operate at a specified set of frequencies, each transducer having a diameter of approximately a wavelength of acoustic waves emitted by the transducers and having a center and disposed at a node such that the center of adjacent transducers are spaced at a distance no greater than the wavelength of acoustic waves emitted by the transducers, wherein the transducers are arranged into several rows, the transducers of each row sharing a common axis, such that the axes intersect at a center of a common central transducer.

2. An ultrasonic sensor according to claim 1, wherein the network is plane.

3. An ultrasonic sensor according to claim 1 wherein the network is a triangular mesh network.

4. A method of detecting the location of objects disposed in a substantially gaseous environment, comprising the steps of:

specifying a shape of at least one object disposed in the substantially gaseous environment;

emitting an ultrasonic wave from a sensor including a plurality of circular transducers the diameter of which is approximately the wavelength of acoustic waves emitted by the transducers, each transducer disposed at one of a plurality of nodes arranged into a uniform network such that the center of adjacent transducers are spaced at a distance no greater than the wavelength of the ultrasonic waves emitted, the wave propagating within the substantially gaseous environment;

receiving an echo from the wave; and analyzing the echo to determine the position of the object within the substantially gaseous environment.

5. A method according to the steps of claim 6, wherein the receiving step includes using the transducers to receive the echo from the wave.

6. A method according to the steps of claim 6, further comprising the step of arranging the transducers into rows such that the receiving step includes receiving the echo from the wave with transducers disposed at ends of the rows.

7. A method according to the steps of claim 6, wherein the shape of the at least one object is specified prior to emitting the ultrasonic wave by scanning the substantially gaseous environment.

8. A method according to the steps of claim 6, wherein the emitting step includes emitting an ultrasonic wave from a specified number of transducers arranged into a row and sharing a common axis that is perpendicular to a shooting plane, such that the emitted wave is propagating within a thin volume enveloping the shooting plane.

9. A method according to the steps of claim 6, wherein the emitting step includes emitting an ultrasonic wave from transducers arranged into a disc such that a central transducer is disposed at a center of the disc.

* * * * *